Figure 1:
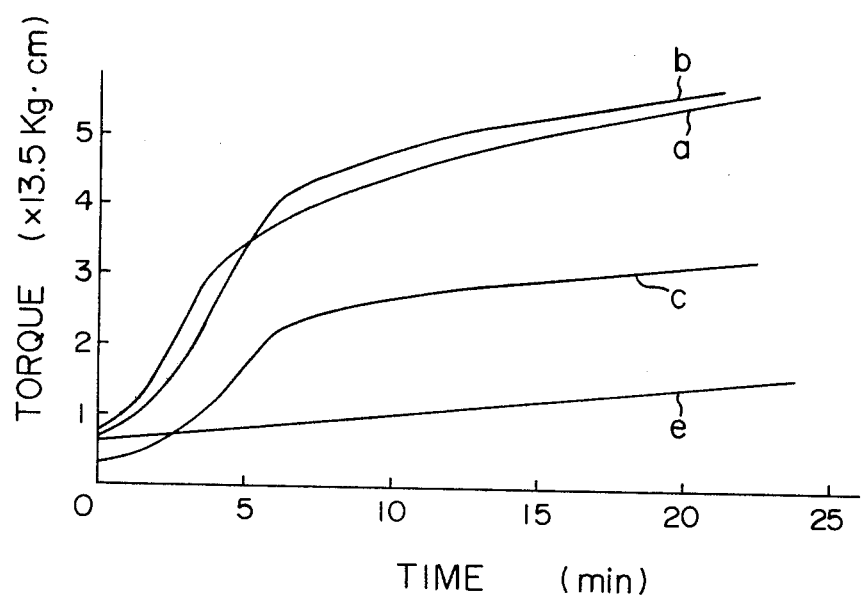

United States Patent [19]

Matoba

[11] 4,268,640
[45] May 19, 1981

[54] CURABLE COMPOSITION OF HALOGEN-CONTAINING POLYMER

[75] Inventor: Yasuo Matoba, Toyonaka, Japan

[73] Assignee: Osaka Soda Co. Ltd., Osaka, Japan

[21] Appl. No.: 94,201

[22] Filed: Nov. 14, 1979

[30] Foreign Application Priority Data

Nov. 22, 1978 [JP] Japan ............................ 53-144535
Mar. 8, 1979 [JP] Japan ............................ 54-27495
May 10, 1979 [JP] Japan ............................ 54-57687

[51] Int. Cl.$^3$ .......................... C08F 8/34; C08C 19/22
[52] U.S. Cl. .................................. 525/346; 525/352; 525/403
[58] Field of Search .................... 525/352, 346, 403

[56] References Cited

U.S. PATENT DOCUMENTS

| | | | |
|---|---|---|---|
| 2,804,447 | 8/1957 | Naylor | 525/352 |
| 3,303,172 | 2/1967 | Schreiber | 525/352 |
| 3,317,491 | 5/1967 | Kanavel | 525/352 |
| 3,976,625 | 8/1976 | Starmer | 525/352 |

Primary Examiner—William F. Hamrock
Attorney, Agent, or Firm—Sherman & Shalloway

[57] ABSTRACT

A curable composition consisting essentially of
(1) 100 parts by weight of a halogen-containing polymer,
(2) 0.1 to 10 parts by weight of a substituted mono- or di-thiobiurea as a crosslinking agent having the formula

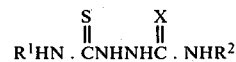

wherein $R^1$, $R^2$ and X are as defined in claim 1 and
(3) 0.5 to 50 parts by weight of a compound of a metal of Group II or IVa of the periodic table as an acid acceptor.

6 Claims, 1 Drawing Figure

CURABLE COMPOSITION OF HALOGEN-CONTAINING POLYMER

This invention relates to a curable composition of a halogen-containing polymer, and to a crosslinking agent therefor which can readily and effectively induce curing of the halogen-containing polymer.

More specifically, this invention pertains to a curable composition consisting essentially of (1) 100 parts by weight of a halogen-containing polymer, (2) 0.1 to 10 parts by weight of a substituted mono- or di-thiobiurea as a crosslinking agent having the formula

wherein $R^1$ represents a member selected from the group consisting of alkyl groups containing 1 to 18 carbon atoms, cycloalkyl groups containing 5 to 18 carbon atoms, alkenyl groups containing 2 to 18 carbon atoms, aryl groups containing 6 to 18 carbon atoms and aralkyl groups containing 7 to 18 carbon atoms; $R^2$ represents a hydrogen atom or a member selected from the same group as defined above for $R^1$; X represents a sulfur or oxygen atom; and when X is an oxygen atom, $R^2$ represents a hydrogen atom, and (3) 0.5 to 50 parts by weight of a compound of a metal of Group II or IVa of the periodic table as an acid acceptor.

Halogen-containing polymers such as polychloroprene, polyepichlorohydrin, an epichlorohydrin/ethylene oxide copolymer, chlorine-containing acrylic rubber, chlorinated polyethylene, brominated butyl rubber, fluorine rubber and polyvinyl chloride in the cured state find extensive use as materials having superior thermal stability, oil resistance and chemical resistance. It has been difficult however to cure the halogen-containing polymers effectively because the carbon-halogen bond in these polymers is chemically stable.

Numerous curing agents for halogen-containing polymers have been suggested heretofore, but none have shown a satisfactory curing effect. 2-Mercaptoimidazoline, a typical curing agent now in commercial use, too, has the defect that it cannot cure polymers having relatively low reactivity, such as chlorinated polyethylene or polyvinyl chloride, at a feasible speed. In addition, it has been pointed out that 2-mercaptoimidazoline may be carcinogenic (P. R. Johnson, Rubber Journal, pages 37–44, April 1973).

In view of the state of the art, it has been desired to develop other curing agents of industrial value which can easily and effectively cure halogen-containing polymers having relatively low reactivity.

We have worked extensively in order to develop such curing agents, and found that substituted mono- or di-thiobiureas of formula (I) given hereinabove are very useful as crosslinking agents which readily and effectively exert a curing action on a wide range of halogen-containing polymers including those of relatively low reactivity as exemplified hereinabove.

A method for producing the compounds of formula (I) is known, and disclosed, for example, in C. K. Bradsher et al.: J. Org. Chem., 23, 618–619 (1958). This prior art reference only states that several of the 1-substituted thiobiureas significantly accelerated the rate of growth of microorganism (A. niger) at 250 p.p.m. Use of the compound of formula (I) as a crosslinking agent has been quite unknown.

Unexpectedly, we have found that the substituted mono- or di-thiobiureas of formula (I), optionally in combination with a vulcanization accelerator, exhibit superior performances as a crosslinking agent for a wide variety of halogen-containing polymers. It has also been found that cured products obtained by curing halogen-containing polymers with the compounds of formula (I) as a crosslinking agent and the acid acceptor (3), optionally in combination with a vulcanization accelerator, have good properties, and the curing time changes little with changes in the amount of the crosslinking agent, thus ensuring a good reproducibility of quality.

It is an object of this invention therefore to provide an improved curable composition of a halogen-containing polymer.

Another object of this invention is to provide a crosslinking agent useful for such a curable halogen-containing polymer composition.

The above and other objects and advantages of this invention will become more apparent from the following description.

The halogen-containing polymer in the curable composition of this invention includes a variety of polymers such as chlorinated polyethylene, a chlorinated ethylenepropylene copolymer, a chlorinated ethylene/propylene/nonconjugated diene terpolymer, chlorosulfonated polyethylene, polyvinyl chloride, chlorine-containing acrylic rubber, chlorinated butyl rubber, brominated butyl rubber, fluorine rubber, polychloroprene, polyepichlorohydrin, an epichlorohydrin/allyl glycidyl ether copolymer, an epichlorohydrin/ethylene copolymer, and an epichlorohydrin/ethylene oxide/allyl glycidyl ether terpolymer.

The crosslinking agent used in this invention is a substituted mono- or di-thiobiurea having the following formula (I)

In this formula, $R^1$ is selected from the class consisting of alkyl groups containing 1 to 18 carbon atoms, preferably 1 to 10 carbon atoms, more preferably 1 to 7 carbon atoms, such as methyl, ethyl, n-propyl, iso-propyl, n-butyl, iso-butyl, tert.-butyl, n-pentyl, iso-pentyl, n-hexyl and n-heptyl; cycloalkyl groups containing 5 to 18 carbon atoms, preferably 6 to 14 carbon atoms, such as cyclohexyl, 4-ethylcyclohexyl or 4-(2-ethyl)hexylcyclohexyl; alkenyl groups containing 2 to 18 carbon atoms, preferably 3 to 18 carbon atoms, such as allyl or oleyl; aryl groups containing 6 to 18 carbon atoms, preferably 6 to 8 carbon atoms, such as phenyl, tolyl or p-ethylphenyl; and aralkyl groups containing 7 to 18 carbon atoms, preferably 7 to 10 carbon atoms, such as benzyl or phenethyl.

X in the above formula represents S or O, and when X represents O, $R^2$ is a hydrogen atom.

Typical examples of the compounds of formula (I) include:
1-methyl-2,5-dithiobiurea,
1-isopropyl-2,5-dithiobiurea,
1-allyl-2,5-dithiobiurea,
1-phenyl-2,5-dithiobiurea, 1-benzyl-2,5-dithiobiurea,
1-methyl-2-thiobiurea,
1-isopropyl-2-thiobiurea,
1-allyl-2-thiobiurea,
1-phenyl-2-thiobiurea,
1-benzyl-2-thiobiurea,
1,6-dimethyl-2,5-dithiobiurea,
1-isopropyl-6-methyl-2,5-dithiobiurea,
1-allyl-6-methyl-2,5-dithiobiurea,
1-phenyl-6-isopropyl-2,5-dithiobiurea, and
1-benzyl-6-cyclohexyl-2,5-dithiobiurea.

The curable composition of this invention further contains a compound of a metal of Group II or IVa of the periodic table as an acid acceptor. The metal compounds as an acid acceptor include hydroxides, carbonates, carboxylates, silicates, borates, and phosphites of metals of Group II of the periodic table, preferably Mg, Ba, Ca and Zn; and oxides, basic carbonates, basic carboxylates, basic phosphites, basic sulfites, and tribasic sulfates of metals of Group IVa of the periodic table, preferably Sn and Pb. Specific examples are magnesia, magnesium hydroxide, barium hydroxide, magnesium carbonate, barium carbonate, quick lime, slaked lime, calcium carbonate, calcium silicate, calcium stearate, zinc stearate, calcium phthalate, magnesium phosphite, dicalcium phosphite, zinc oxide, tin oxide, litharge, red lead, white lead, dibasic lead phthalate, dibasic lead carbonate, tin stearate, basic lead phosphite, basic tin phosphite, basic lead sulfite, and tribasic lead sulfate.

The curable composition of this invention consists essentially of 100 parts by weight of the halogen-containing polymer (1), 0.1 to 10 parts by weight, preferably 0.3 to 6 parts by weight, of the substituted mono- or di-thiobiurea of formula (I) as a crosslinking agent, and 0.5 to 50 parts by weight, preferably 1 to 30 parts by weight, of the compound of a metal of Group II or IVa of the periodic table as an acid acceptor.

When the amount of the crosslinking agent (2) is below the specified limit, the crosslinking effect is insufficient, and when it exceeds the upper limit specified, the resulting cured product is comparatively brittle. When the amount of the acid acceptor is below the specified limit, the resulting cured product has poor resistance to heat deterioration, and when it exceeds the upper limit, the mechanical properties (such as tensile strength and elongation) of the resulting cured product are degraded.

In addition to the aforesaid three essential ingredients (1), (2) and (3), the curable composition of this invention may further include other additives conventionally used in the art.

Examples of such additives include organic or inorganic fillers such as calcium carbonate, clay, talc, diatomaceous earth, ferrite, mica powder, barium sulfate, graphite, glass fibers, cork powder and wood flour; reinforcing agents such as carbon black, silica, calcium silicate and basic magnesium carbonate; plasticizers such as dioctyl phthalate, diisodecyl adipate, chlorinated paraffin and process oils for rubbers; processing aids such as paraffin wax and stearic acid; antioxidants such as polymerized trimethyl dihydroquinoline, 2,6-di-tert-butyl-4-methylphenol and dilauryl thiodipropionate; coloring agents such as titanium oxide, red iron oxide and ultramarine; and fire retarding agents such as antimony trioxide, aluminum hydroxide, zinc borate, tris(chloroethyl)phosphate and tetrabromobisphenols.

The amounts of these additives per 100 parts by weight of the halogen-containing polymer are up to about 1000 parts by weight for the fillers; up to about 200 parts by weight for the reinforcing agent; up to about 100 parts by weight for the plasticizers; up to about 10 parts by weight for the processing aids; up to about 5 parts by weight for the antioxidants; up to about 50 parts by weight for the coloring agents; and up to about 50 parts by weight for the fire retardants.

The composition of this invention may further include a vulcanization accelerator, the use of which is preferred for halogen-containing polymers having a relatively low reactivity such as chlorinated polyethylene, polyvinyl chloride, chlorinated butyl rubber and polyepichlorohydrin. Examples of the vulcanization accelerator are elementary sulfur, thiuram sulfides, dithiocarbamates, sulfenamides, aliphatic or aromatic amines, salts of weak acids such as 2-mercaptobenzothiazole, phthalic acid or benzoic acid with these amines, and addition products of these amines with alcohols or oximes, for examples adducts with cyclohexyl alcohol, or cyclohexanoneoxime.

Specific examples of these vulcanization accelerators are dipentamethylenethiuram tetrasulfide, tetramethylthiuram disulfide, cadmium pentamethylenedithiocarbamate, tellurium dimethyldithiocarbamate, piperidine pentamethylenedithiocarbamate, cyclohexylamine, dibutylamine, dibutylammonium oleate, di-ortho-tolyl guanidine, acetaldehyde aniline, N-cyclohexyl-2-benzothiazothiazyl sulfenamide, N,N'-dicyclohexyl-2-benzothiazyl sulfenamide, and a di-cyclohexylamine salt of 2-mercaptobenzothiazole.

The amount of the vulcanization accelerator is not particularly critical, but is preferably 0.2 to 6 parts by weight per 100 parts by weight of the halogen-containing polymer.

The curable composition of this invention can be prepared by uniformly blending 100 parts by weight of the halogen-containing polymer (1), 0.1 to 10 parts by weight of the substituted mono- or di-thiobiurea compound (2) as a crosslinking agent, 0.5 to 50 parts by weight of the metal compound (3) as an acid acceptor, and optionally the other additives exemplified hereinabove. Blending can be effected by using known blending devices such as a mixing roll, a Banbury mixer, and various kneaders such as a pressure-type kneader. The blending temperature that can be employed is about 50° to about 100° C. for the curing agent and accelerator, and about 60° to about 200° C. for the other compounding agents.

The composition of this invention can be cured by heating it to a temperature of, say, about 100° to about 200° C. The heating time can be chosen properly, and may, for example, be about 0.5 to 120 minutes. Curing of the composition can be performed by any desired methods such as press-forming under heat in a mold, injection molding, and heat molding using a steam can, an air bath, an infrared ray, or microwaves.

The following examples illustrate the present invention more specifically. In these examples, the amounts of the various components are expressed in parts by weight unless otherwise specified.

EXAMPLES 1 TO 5 AND COMPARATIVE EXAMPLE 1

In each run, the ingredients shown in Table 1 were kneaded on an open roll at 60° to 70° C. The resulting sheet was placed in a mold, and molded under pressure at 155° C. and 80 kg/cm$^2$ for 30 minutes. The vulcanizate obtained was tested for the various properties shown in Tables 1. The results are shown in Table 2. In Comparative Example 1, 2-mercaptoimidazoline customarily used as a vulcanizer for chlorinated polyethylene was used.

The cure curves of the compounds obtained in Examples 2 and 4 and Comparative Example 1 were determined by a JSR-type curelastometer at an angle of amplitude of 3° and a temperature of 155° C. The results are plotted in FIG. 1 in which curve a refers to Example 2; curve b, to Example 4; curve c, to Example 6 given hereinbelow; and curve e, to Comparative Example 1.

TABLE 1

| Example | 1 | 2 | 3 | 4 | Comparative Example 1 | 5 |
|---|---|---|---|---|---|---|
| Polychloroprene(*1) | 100 | — | — | — | — | — |
| Epichlorohydrin/ ethylene oxide copolymer(*2) | — | 100 | — | — | — | — |
| Polyepichlorohydrin(*3) | — | — | 100 | — | — | — |
| Chlorinated polyethylene(*4) | — | — | — | 100 | 100 | — |
| Brominated butyl rubber(*5) | — | — | — | — | — | 100 |
| FEF carbon black(*6) | 40 | — | — | — | — | — |
| MAF carbon black(*7) | — | 40 | 40 | — | — | — |
| SRF carbon black(*8) | — | — | — | 50 | 50 | — |
| HAF carbon black(*9) | — | — | — | — | — | 50 |
| Stearic acid | — | 1 | 1 | — | — | — |
| Dioctyl phthalate | — | — | — | 30 | 30 | — |
| Nickel dibutyl-dithiocarbamate | — | 1 | 1 | — | — | — |
| Magnesia | 5 | 5 | — | — | — | — |
| Calcium hydroxide | — | — | 3 | 10 | 10 | — |
| Barium carbonate | — | — | — | — | — | 5 |
| Tellurium diethyldithio-carbamate (accelerator) | — | — | 2 | — | — | — |
| Dibutylammonium oleate (accelerator) | — | — | — | 2 | — | — |
| 1-Methyl-2,5-dithiobiurea | 2 | — | — | — | — | — |
| 1-isopropyl-2,5-Dithiobiurea | — | 2 | — | — | — | — |
| 1-Allyl-2,5-dithiobiurea | — | — | 4 | — | — | — |
| 1-Phenyl-2,5-dithiobiurea | — | — | — | 2 | — | — |
| 1-Benzyl-2,5-dithiobiurea | — | — | — | — | — | 1 |
| 2-Mercaptoimidazoline | — | — | — | — | 4 | — |

(*1) to (*9)in Tables 1 have the following meanings. This applies to the subsequent Tables.
(*1)Neoprene W, a product of E. I. du Pont de Nemours & Co.
(*2)Herclor C-55, a product of Hercules, Inc.
(*3)Herclor H, a product of Hercules, Inc.
(*4)Daisolac MR-104, a product of Osaka Soda Co., Ltd.
(*5)Polysar Bromobutyl X-2, a product of Polyser, Ltd.
(*6)Seast SO, a product of Tokai Carbon Co., Ltd.
(*7)Seast 116, a product of Tokai Carbon Co., Ltd.
(*8)Seast S, a product of Tokai Carbon Co., Ltd.
(*9)Seast 3, a product of Tokai Carbon Co., Ltd.

TABLE 2

| Example | 1 | 2 | 3 | 4 | Comparative Example 1 | 5 |
|---|---|---|---|---|---|---|
| 100% Modulus (kg/cm$^2$) | 61 | 57 | 38 | 40 | 15 | 27 |
| 300% Modulus (kg/cm$^2$) | 194 | 141 | 113 | 142 | 54 | 108 |
| Tensile strength (kg/cm$^2$) | 275 | 172 | 160 | 254 | 87 | 177 |
| Elongation at break (%) | 330 | 405 | 580 | 430 | 510 | 450 |
| Hardness (JIS-A) | 77 | 73 | 70 | 71 | 61 | 57 |
| Permanent compression set (%) | | | | | | |
| 100° C. × 70 hrs., 25% compression | 20 | | | 24 | 87 | |
| 120° C. × 70 hrs., 25% compression | | 31 | 44 | | | |

EXAMPLE 6

| | Parts |
|---|---|
| Polyvinyl chloride ("Zeon 103 EP" a product of Nippon Zeon Co., Ltd.) | 100 |
| Precipitated calcium carbonate | 100 |
| Dioctyl phthalate | 70 |
| Calcium hydroxide | 20 |
| Dibutyltin maleate | 1 |

The above ingredients were kneaded on an open roll at 150° C. To 190 parts of the resulting mixture were added 2 parts of 1-phenyl-2,5-dithiobiurea and 2 parts of 2-mercaptobenzothiazole salt of dicyclohexylamine, and they were kneaded on an open roll at 100° C. The cure curve of the resulting composition was measured by a JSR-type curelastometer at 170° C. with an angle of amplitude of 3°. The result is shown in FIG. 1 (curve c).

EXAMPLES 7 TO 11 AND COMPARATIVE EXAMPLE 2

The procedure of Examples 1 to 5 and Comparative Example 1 was repeated except that each of the compositions shown in Table 3 was used. The results are shown in Table 4.

TABLE 3

| Example | 7 | 8 | Comparative Example 2 | 9 | 10 | 11 |
|---|---|---|---|---|---|---|
| Polychloroprene(*1) | 100 | — | — | — | — | — |
| Epichlorohydrin/ ethylene oxide copolymer(*2) | — | 100 | 100 | — | — | — |
| Polyepichlorohydrin(*3) | — | — | — | 100 | — | — |
| Chlorinated polyethylene(*4) | — | — | — | — | 100 | — |
| Brominated butyl rubber(*5) | — | — | — | — | — | 100 |
| FEF carbon black(*6) | 40 | — | — | — | — | — |
| MAF carbon black(*7) | — | 40 | 40 | 40 | — | — |
| SRF carbon black(*8) | — | — | — | — | 50 | — |
| HAF carbon black(*9) | — | — | — | — | — | 50 |
| Stearic acid | — | 1 | 1 | 1 | — | — |
| Dioctyl phthalate | — | — | — | — | 30 | — |
| Nickel dibutyl-dithiocarbamate | — | 1 | 1 | 1 | — | — |
| Magnesia | 5 | — | — | — | — | — |
| Calcium hydroxide | — | 5 | — | 3 | 10 | — |
| Red lead | — | — | 5 | — | — | — |
| Barium carbonate | — | — | — | — | — | 5 |
| Tellurium diethyldithio-carbamate (accelerator) | — | — | — | 1 | — | — |
| Dibutyl ammonium oleate (accelerator) | — | — | — | 1 | 3 | — |
| 1-Methyl-2-thiobiurea | 3 | — | — | — | — | — |
| 1-Isopropyl-2-thiobiurea | — | 2.5 | — | — | — | — |
| 1-Allyl-2-thiobiurea | — | — | — | 4 | — | — |
| 1-Phenyl-2-thiobiurea | — | — | — | — | 3 | — |
| 1-Benzyl-2-thiobiurea | — | — | — | — | — | 2 |

TABLE 3-continued

| Example | 7 | 8 | Comparative Example 2 | 9 | 10 | 11 |
|---|---|---|---|---|---|---|
| 2-Mercaptoimidazoline | — | — | 1.2 | — | — | — |

TABLE 4

| Example | 7 | 8 | Comparative Example 2 | 9 | 10 | 11 |
|---|---|---|---|---|---|---|
| 100% Modulus (kg/cm$^2$) | 54 | 44 | 33 | 35 | 30 | 33 |
| 300% Modulus (kg/cm$^2$) | 178 | 124 | 103 | 109 | 117 | 117 |
| Tensile strength (kg/cm$^2$) | 231 | 145 | 134 | 146 | 191 | 191 |
| Elongation at break (%) | 370 | 430 | 500 | 540 | 490 | 405 |
| Hardness (JIS-A) | 74 | 71 | 67 | 69 | 67 | 60 |
| Resistance to heat aging* | | | Unmeasurable because of softening | | | |
| Percent change of tensile strength (%) | | | −66 | | | |
| Perchange change of elongation (%) | | | −69 | | | |
| Change of hardness (point) | | | +3 | | | |

*In a Geer oven at 150° C. for 14 days.

EXAMPLES 12 TO 17

The procedure of Examples 1 to 5 and Comparative Example 1 was repeated except that each of the compositions shown in Table 5 was used. The results are shown in Table 6.

TABLE 5

| Example | 12 | 13 | 14 | 15 | 16 | 17 |
|---|---|---|---|---|---|---|
| Polychloroprene(*1) | 100 | — | — | — | — | — |
| Epichlorohydrin/ethylene oxide copolymer(*2) | — | 100 | — | — | — | — |
| Polyepichlorohydrin(*3) | — | — | 100 | — | — | — |
| Chlorinated polyethylene(*4) | — | — | — | 100 | 100 | — |
| Brominated butyl rubber(*5) | — | — | — | — | — | 100 |
| FEF carbon black(*6) | 40 | — | — | — | — | — |
| MAF carbon black(*7) | — | 40 | 40 | — | — | — |
| SRF carbon black(*8) | — | — | — | 50 | 50 | — |
| HAF carbon black(*9) | — | — | — | — | — | 50 |
| Stearic acid | — | 1 | 1 | — | — | — |
| Dioctyl phthalate | — | — | — | 30 | 30 | — |
| Nickel dibutyldithiocarbamate | — | 1 | 1 | — | — | — |
| Magnesia | 5 | 5 | 5 | — | — | — |
| Calcium hydroxide | — | — | — | 10 | 10 | — |
| Barium carbonate | — | — | — | — | — | 5 |
| Piperidine pentamethylenedithiocarbamate (accelerator) | — | — | — | 2 | — | — |
| 2-Mercaptobenzothiazole salt of dicyclohexylamine (accelerator) | — | — | — | — | 2 | — |
| 1,6-Dimethyl-2,5-dithiobiurea | 2 | — | — | — | 4 | — |
| 1-Isopropyl-6-methyl-2,5-dithiobiurea | — | 3 | — | — | — | — |
| 1-Allyl-6-methyl-2,5-dithiobiurea | — | — | 4 | — | — | — |
| 1-Phenyl-6-isopropyl-2,5-dithiobiurea | — | — | — | 4 | — | — |
| 1-Benzyl-6-cyclohexyl-2,5-dithiobiurea | — | — | — | — | — | 2 |

TABLE 6

| Example | 12 | 13 | 14 | 15 | 16 | 17 |
|---|---|---|---|---|---|---|
| 100% Modulus (kg/cm$^2$) | 54 | 55 | 47 | 37 | 40 | 29 |
| 300% Modulus (kg/cm$^2$) | 179 | 144 | 130 | 133 | 144 | 112 |
| Tensile strength (kg/cm$^2$) | 250 | 170 | 172 | 235 | 249 | 170 |
| Elongation at break (%) | 360 | 410 | 550 | 490 | 470 | 420 |
| Hardness (JIS-A) | 75 | 71 | 72 | 68 | 70 | 60 |
| Permanent compression set (%) | | | | | | |
| 100° C. × 70 hrs., 25% compression | 22 | | | 28 | 30 | |
| 120° C. × 70 hrs., 25% compression | | 36 | 37 | | | 37 |

What we claim is:

1. A curable composition consisting essentially of
(1) 100 parts by weight of a halogen-containing polymer,
(2) 0.1 to 10 parts by weight of a substituted mono- or di-thiobiurea as a crosslinking agent having the formula

wherein R$^1$ represents a member selected from the group consisting of alkyl groups containing 1 to 18 carbon atoms, cycloalkyl groups containing 5 to 18 carbon atoms, alkenyl groups containing 2 to 18 carbon atoms, aryl groups containing 6 to 18 carbon atoms and aralkyl groups containing 7 to 18 carbon atoms; R$^2$ represents a hydrogen atom or a member selected from the same group as defined above for R$^1$; X represents a sulfur or oxygen atom; and when X is an oxygen atom, R$^2$ represents a hydrogen atom, and
(3) 0.5 to 50 parts by weight of a compound of a metal of Group II or IVa of the periodic table as an acid acceptor.

2. The composition of claim 1 wherein said halogen-containing polymer is a member selected from the group consisting of chlorinated polyethylene, a chlorinated ethylene-propylene copolymer, a chlorinated ethylene-propylene-nonconjugated diene terpolymer, chlorosulfonated polyethylene, polyvinyl chloride, chlorine-containing acrylic rubber, chlorinated butyl rubber, brominated butyl rubber, fluorine rubber, polychloroprene, polyepichlorohydrin, an epichlorohydrin-allyl glycidyl ether copolymer, an epichlorohydrin-ethylene oxide copolymer, and an epichlorohydrin-ethylene oxide-allyl glycidyl ether terpolymers.

3. The composition of claim 1 which further includes 0.2 to 6 parts by weight, per 100 parts by weight of the halogen-containing polymer, of a vulcanization accelerator.

4. The composition of claim 1 wherein said compound (3) is a compound of a metal selected from the group consisting of Mg, Ca, Ba, Zn, Sn and Pb.

5. In a process for curing halogen-containing polymers, the improvement comprising using as a crosslinking agent for the halogen-containing polymers, a substituted mono- or di-thiobiurea of the formula:

wherein $R^1$ represents a member selected from the group consisting of alkyl groups containing 1 to 18 carbon atoms, cycloalkyl groups containing 5 to 18 carbon atoms, alkenyl groups containing 2 to 18 carbon atoms, aryl groups containing 6 to 18 carbon atoms and aralkyl groups containing 7 to 18 carbon atoms; $R^2$ represents a hydrogen atom or a member selected from the same group as defined above for $R^1$; X represents a sulfur or oxygen atom; and when X is an oxygen atom, $R^2$ represents a hydrogen atom.

6. The process of claim 5 wherein 0.1 to 10 parts by weight of the cross-linking agent are used per 100 parts by weight of the halogen-containing polymer.